US012729161B2

(12) United States Patent
Robertson et al.

(10) Patent No.: US 12,729,161 B2
(45) Date of Patent: Sep. 8, 2026

(54) BINDER FOR AN AGGLOMERATION PROCESS

(71) Applicant: MINTEK, Randburg (ZA)

(72) Inventors: Stefan Walters Robertson, Randburg (ZA); Sibabalwe Mxinwa, Randburg (ZA); Petrus Basson, Randburg (ZA); Mpumelelo Success Ndhlalose, Randburg (ZA); Duduzile Nontobeko Nxumalo, Randburg (ZA)

(73) Assignee: MINTEK, Randburg (ZA)

( * ) Notice: Subject to any disclaimer, the term of this patent is extended or adjusted under 35 U.S.C. 154(b) by 766 days.

(21) Appl. No.: 18/245,069

(22) PCT Filed: Sep. 9, 2021

(86) PCT No.: PCT/ZA2021/050052
§ 371 (c)(1),
(2) Date: Mar. 13, 2023

(87) PCT Pub. No.: WO2022/056560
PCT Pub. Date: Mar. 17, 2022

(65) Prior Publication Data

US 2023/0416150 A1 Dec. 28, 2023

(30) Foreign Application Priority Data

Sep. 14, 2020 (ZA) ................................ 2020/05688

(51) Int. Cl.
*C04B 28/08* (2006.01)
*C01F 17/282* (2020.01)
(Continued)

(52) U.S. Cl.
CPC .......... *C04B 28/082* (2013.01); *C01F 17/282* (2020.01); *C01G 3/10* (2013.01);
(Continued)

(58) Field of Classification Search
None
See application file for complete search history.

(56) References Cited

U.S. PATENT DOCUMENTS 5,116,417 A * 5/1992 Walker, Jr. .............. C22B 11/08 106/710
5,332,559 A * 7/1994 Brierley .................... C22B 3/18 75/772
5,820,668 A 10/1998 Comrie

FOREIGN PATENT DOCUMENTS

| | | | |
|---|---|---|---|
| CN | 109824309 | A | 5/2019 |
| JP | 2008030968 | A | 2/2008 |
| WO | 2009014255 | A1 | 1/2009 |

OTHER PUBLICATIONS

Bouffard, “Review of agglomeration practice and fundamentals in heap leaching,” Mineral Processing and Extractive Metallurgy Review, Dec. 1, 2004 (56 pages).
(Continued)

*Primary Examiner* — John J Figueroa
(74) *Attorney, Agent, or Firm* — Michael Best & Friedrich LLP

(57) ABSTRACT

A binder for use in leaching a heap of a low-permeability ore containing at least one of the following: copper ore, copper/cobalt ore, nickel laterite ore and uranium ore, wherein the binder comprises an acid-proof cement formed by modifying ordinary Portland cement (OPC) with a supplementary cementitious material (SCM).

13 Claims, 5 Drawing Sheets

(51) Int. Cl.

| | |
|---|---|
| ***C01G 3/10*** | (2006.01) |
| ***C01G 51/10*** | (2006.01) |
| ***C01G 53/10*** | (2006.01) |
| ***C04B 14/04*** | (2006.01) |
| ***C04B 18/14*** | (2006.01) |
| ***C04B 28/04*** | (2006.01) |
| ***C22B 1/243*** | (2006.01) |
| ***C22B 3/08*** | (2006.01) |
| ***C22B 15/00*** | (2006.01) |
| *C04B 111/00* | (2006.01) |
| *C04B 111/23* | (2006.01) |

(52) U.S. Cl.

CPC ............. *C01G 51/10* (2013.01); *C01G 53/10* (2013.01); *C04B 14/045* (2013.01); *C04B 18/146* (2013.01); *C04B 28/04* (2013.01); *C22B 1/243* (2013.01); *C22B 3/08* (2013.01); *C22B 15/0004* (2013.01); *C22B 15/0071* (2013.01); *C04B 2111/0087* (2013.01); *C04B 2111/23* (2013.01)

(56) References Cited

OTHER PUBLICATIONS

International Search Report and Written Opinion for Related Application No. PCT/ZA2021/050052 dated Jan. 10, 2022 (10 pages).

International Preliminary Report on Patentability for Related Application No. PCT/ZA2021/050052 dated Jan. 4, 2023 (7 pages).

Annex to International Preliminary Report on Patentability for Related Application No. PCT/ZA2021/050052 dated Jan. 4, 2023 (5 pages).

* cited by examiner

BINDER FOR AN AGGLOMERATION PROCESS

CROSS REFERENCE TO RELATED APPLICATIONS

This application is a U.S. National Phase application of International Application No. PCT/ZA2021/050052, filed Sep. 9, 2021, which claims priority to South African Application No. 2020/05688, filed Sep. 14, 2020, the entire contents of both of which are herein incorporated by reference.

BACKGROUND OF THE INVENTION

This invention relates to a binder for an agglomeration process for incompetent ores which are to be subjected to an acid leach process.

Heap leaching is used for hydrometallurgical processing of low-grade copper ores. The process has low capital and operating costs, low energy and water requirements, a rapid construction phase and fast capital pay-back.

In order for the ore to be amenable to heap leaching, the heaped ore must have sufficient solution permeability and the target mineral must be liberated and be soluble at temperatures that can be maintained in the heap. For this reason, commercial copper heap leaching has been limited to oxides and secondary sulphides. Heap leaching of primary copper sulphides has been tested on pilot or demonstration scale.

The supply of reagents and air to the ore, and the flow of products out of the heap, can be limiting factors that affect the rate of leaching. African ores often have a high clay content and poor permeability, which adversely affect the hydrodynamic performance of the ore bed. Non-uniform percolation caused by the presence of ore fines is a common problem in heap leach operations. Fines segregation can cause channeling and blocking of flow paths. This leads to poor interaction between the ore and leach solution, producing inadequate metal recoveries, or longer leach times.

The conventional solution to dealing with the problem of fines segregation is agglomeration, which is performed by contacting the ore in a rotating drum with raffinate and binder or sulphuric acid. The agglomeration step causes the fines to adhere to larger ore particles.

Whereas cement is widely used as a binder for agglomerating gold ore in gold heap leach operations (in an alkaline medium), there is currently, to the applicant's knowledge, no binder (except acid) which can be used commercially for copper ores. Traditionally cement is not used for copper heap leaching since copper is leached in an acidic medium, and cement forms mineral hydrate bonds in an alkaline medium, which breaks down in acid.

Conventionally these issues are addressed, during acid heap leaching of copper containing ores, by implementing any one of the following: by screening out fines; employing a split circuit comprising heap and tank leaching; use of binders such as sulphuric acid; using other leaching systems such as cribs, ponds and vats; blending more competent ores with clay-bearing ores; and installing retaining walls, horizontal drains and vertical dewatering wells. None of the preceding solutions is effective and may result in significant metal losses.

Agglomeration of an ore with a binder has been recommended if the ore contains more than 10% to 14% of fines (−150 μm).

Several binders have been tested, but none of these was particularly successful for the copper industry, possibly because of the binder cost, large consumption and curing issues, and a limited selection of acid-tolerant and microbial-resistant binders. Lime, molasses and wood fibres, for example, were found to be ineffective.

The development of an agglomeration binder for use in an acid heap leach operation has the potential of unlocking heap leach resources which could not otherwise be exploited due to poor ore permeability.

It is an aim of the current invention to address at least partly the aforementioned issues.

SUMMARY OF THE INVENTION

The invention provides a binder for use in leaching a heap of a low-permeability ore containing at least one of the following: copper ore, copper/cobalt ore, nickel laterite ore and uranium ore, wherein the binder comprises a modified or acid-proof cement.

The acid-proof cement may also be referred to as an acid-resistant cement and may be formed by modifying ordinary Portland cement (OPC) with a supplementary cementitious material (SCM).

The OPC may be modified by the addition of one or a combination of the following SCMs:

- coal power station fly ash (class F), 10-80 mass % but typically 15-25 mass %;
- coal power station fly ash (class C), 10-80 mass % but typically 15-40 mass %;
- ground iron blast furnace slag, 10-80 mass % but typically 35-50 mass %;
- silica fume, 10-80 mass % but typically 5-10 mass %;
- natural pozzolans such as volcanic ash, volcanic rock or metakaolin; and
- sodium silicate (water glass).

Alternatively, an acid-resistant cement may be formed by modifying any one of or a combination of the abovementioned SCMs, with the addition of an alkali-activator, such as sodium hydroxide or sodium silicate (typically 10 mass %).

The abovementioned SCMs (fly ash, furnace slag, silica fume, volcanic ash, volcanic rock, metakaolin and sodium silicate) contain pozzolanic properties, whereby calcium is consumed to produce additional calcium silicate hydrate (C—S—H in cement chemist notation) and calcium aluminate hydrate (C-A-H) reaction products to replace calcium hydroxide (C—H) bonds, thereby increasing the strength and acid resistance of the agglomerates.

The invention extends to a method of agglomerating a low-permeability ore comprising one or more of the following: copper ore, copper/cobalt ore, nickel laterite ore and uranium ore using a binder, wherein the binder is a modified or acid-proof cement of the aforementioned kind.

BRIEF DESCRIPTION OF THE DRAWINGS

The invention is further described by way of example with reference to the accompanying drawings wherein.

DESCRIPTION OF PREFERRED EMBODIMENT

Figure 1:
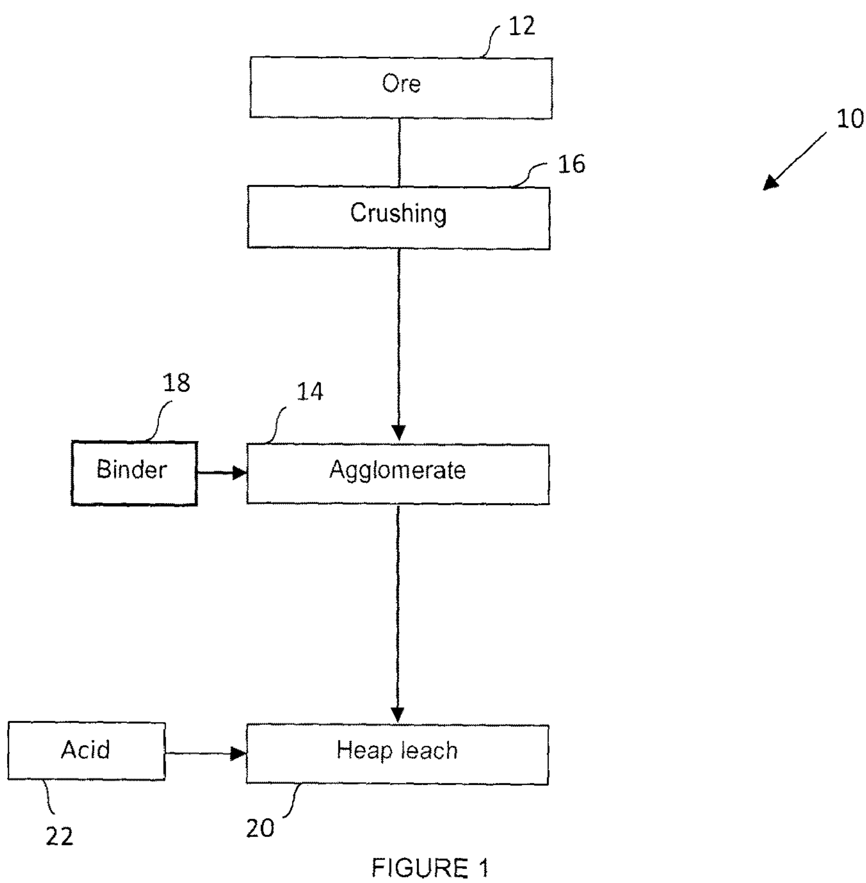
FIG. 1 is a diagrammatical representation of a heap leaching process wherein the ore to be leached has been agglomerated using a binder according to the invention.

FIG. 1 is a diagrammatical representation of an acid heap leaching process (10) wherein ore (12) is agglomerated (14), after crushing (16) using a binder (18), according to the invention. The agglomeration is performed using water and cement only. After agglomeration, the agglomerated ore is allowed to cure (typically for 28 days) in a heap (20) to allow hydrate bonds to form and harden. Acid (22) is then introduced during irrigation after the curing step.

The agglomerates were tested with a uni-axial compression (stacking) test method and the compressed agglomerates passed the screening test criteria by maintaining a bed porosity of above 30%, and a saturated hydraulic conductivity above 1000 $L/m^2/h$ at a mechanical load equivalent to a 6 m stacking height.

Test work include stacking tests performed on a copper waste pile material with high fines content, agglomerated with various dosages of modified Portland 32.5 N and 42.5 N cements.

The binder was tested on a copper ore sample containing 40% −150 μm and 68% −5 mm material.

Figure 2A:
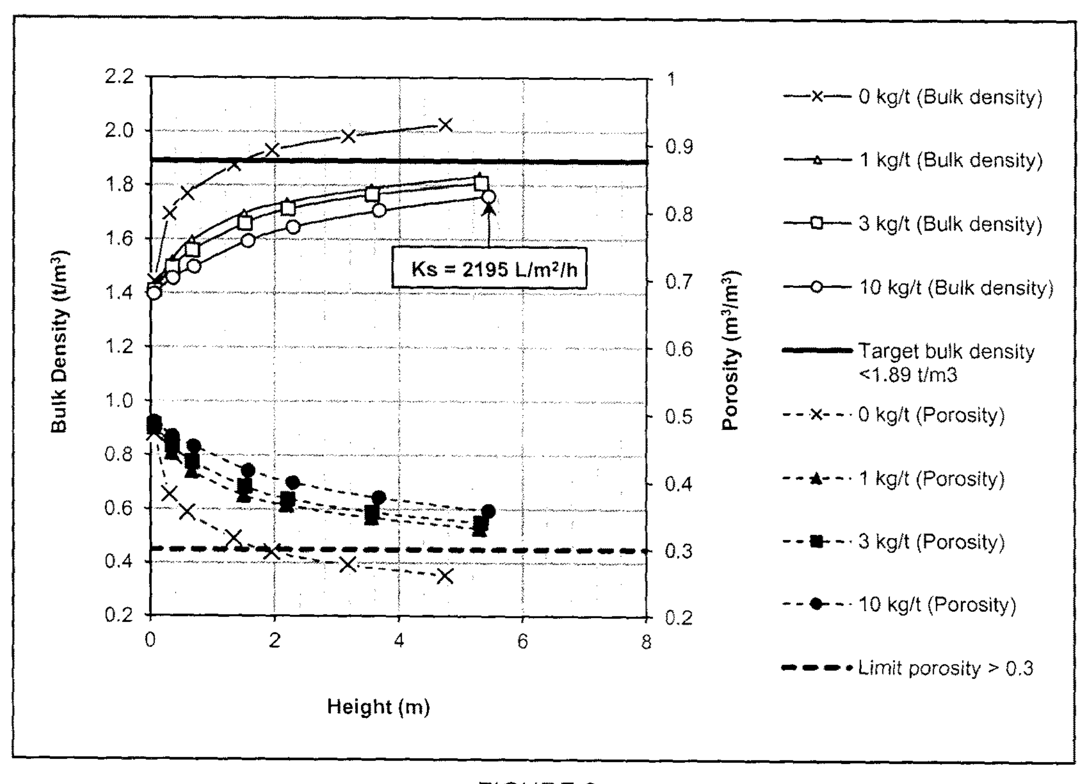
FIG. 2*a* is a diagram showing stacking test bulk density and porosity profiles as a function of height for Cement A.
Figure 2B:
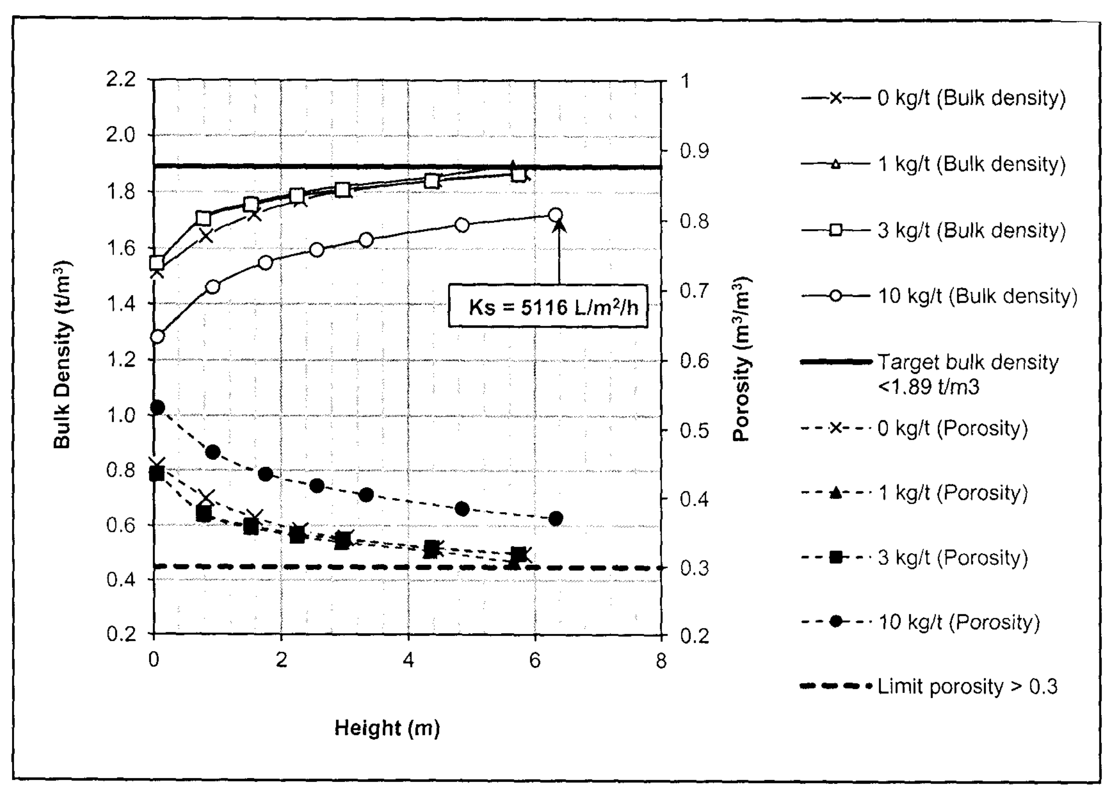
FIG. 2*b* is a diagram showing stacking test bulk density and porosity profiles as a function of height for Cement B.
Figure 2C:
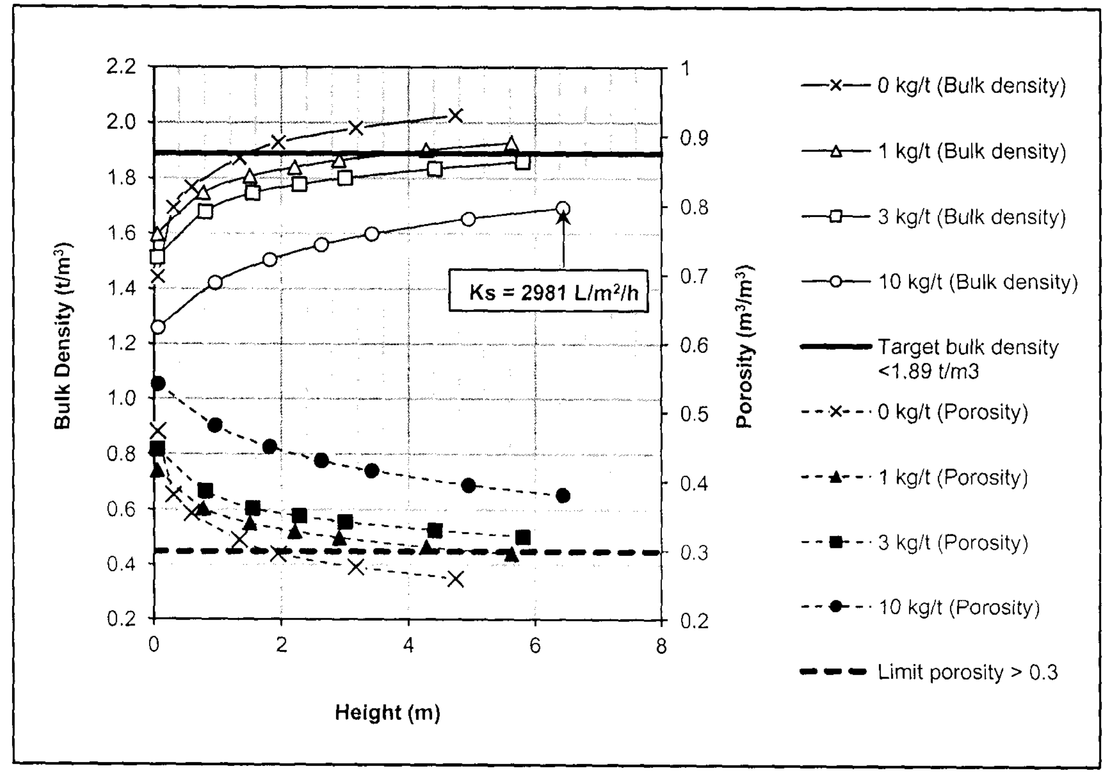
FIG. 2*c* is a diagram showing stacking test bulk density and porosity profiles as a function of height for Cement C.

The sample was agglomerated with binder additions of between 0 and 10 kg/t. Uni-axial compression (stacking) tests were performed to a load equivalent of a 6 m stacking height to test the agglomerate strength. The compressibility of the sample decreased with increased binder addition (FIG. 2). Samples with 3 kg/t and 10 kg/t binder additions maintained bulk densities below the target of 1.9 $t/m^3$ and porosities above the target of 0.3 $m^3/m^3$ after compression.

Saturated hydraulic conductivities (Ks) were measured by passing an acid solution (5 g/L $H_2SO_4$) from a constant-head reservoir through the saturated bed after compression. Samples with 3 kg/t and 10 kg/t binder dosages achieved saturated hydraulic conductivities above the target of 100× the target application rate (i.e. 1000 $L/m^2/h$ for a 10 $L/m^2/h$ irrigation rate), whereas the other two samples did not conduct solution. The preliminary results therefore indicate that whole ore percolation leaching can be performed at binder additions of 3 kg/t and 10 kg/t.

The use of acidified water during the pre-irrigation and saturated hydraulic conductivity measurements also indicates that the cement bonds were not initially destroyed in acid.

The stacking test method was also improved to include a pre-wetting step by irrigation at 6 $L/m^2/h$ for 24 hours, followed by draining overnight, before commencing the compression sequence. Since most of the slumping in columns and heaps occurs during initial pre-wetting, this provides a more realistic result. When the agglomerates contain only agglomeration moisture, the agglomerates are harder and over-predict the agglomerate strength.

The potential increase in revenue for operations associated with whole ore leaching versus slimes removal is summarised in Table 1, assuming a copper price of US $6000 per tonne and a uniform copper distribution through the ore.

Using an average cement price of US $100/tonne and a copper price of US $6000/tonne, the estimated relative cost of cement binder to copper revenue is shown in Table 2. The cost of binder is relatively small compared to the revenue for the various estimated copper head grades shown.

TABLE 1

Examples of potential revenue increase from improved copper recovery

| Project | Production (tpa Cu) | Fines Loss (%) | Revenue [1] (M US $/a) | Revenue [2] (M US $/a) | Increase (%) |
|---|---|---|---|---|---|
| Operation A | 20 000 | 40 [3] | 72 | 120 | 67 |
| Operation B | 5 000 [3] | 40 | 18 | 30 | 67 |
| Operation C | 5 000 [3] | 60 | 12 | 30 | 150 |
| Operation D | 5 000 [3] | 20 | 24 | 30 | 25 |
| Operation E | 25 000 | 15 | 128 | 150 | 17 |
| Operation F | 25 000 | 15 | 128 | 150 | 17 |

Notes:

[1] Fines removal (by screening)

[2] Agglomeration binder

[3] Estimation

4. A copper price of US $6000/tonne and uniform copper distribution in the ore were assumed. The contribution to revenue from cobalt recovery was ignored for the sake of simplicity.

TABLE 2

Cost of binder

| Leachable Copper Grade (%) | Copper Revenue (US $/t ore) | Cost of Binder at 1 kg/t (US $/t ore) | Cost of Binder at 3 kg/t (US $/t ore) |
|---|---|---|---|
| 0.2 | 12 | 0.1 | 0.3 |
| 0.3 | 18 | 0.1 | 0.3 |
| 0.4 | 24 | 0.1 | 0.3 |
| 0.5 | 30 | 0.1 | 0.3 |
| 0.6 | 36 | 0.1 | 0.3 |
| 0.8 | 48 | 0.1 | 0.3 |

The process has great potential for unlocking regional and international low-grade copper and other base metal resources, which would otherwise be uneconomical to process due to poor solution permeability.

Apart from clay-containing African copper and copper/cobalt ores, nickel laterite ores also have poor permeability, and are difficult to treat by conventional processes such as pressure leaching and smelting. These processes also have high capital costs. The development of a commercial binder for use in an acidic medium may therefore unlock substantial nickel resources as well, by successful low-cost heap leach treatment.

The invention is not limited to heap leaching in an acidic medium, but may also be applied to heap leaching in an acidic chloride/sulphate medium and in an alkali medium.

The increased strength derived from the modified binder can also be applied to improve permeability during the heap leaching in an alkali medium of precious metal ores such as gold, silver and PGM ores.

The invention is not limited to heap leaching of crushed and run-of-mine (ROM) ores, but can also be applied to the leaching of base metal and precious metal tailings materials (typically −75 μm) in both acidic and alkali media.

Column Leach Tests

Six column leach tests were performed on a copper ore sample to exemplify the invention. The tests were conducted in water-jacketed, poly-propylene columns: four tests in 1 m. ϕ160 mm ID columns (Tests 1, 2, 3 and 4); one test in a 4 m, ϕ200 mm ID column (Test 6), and one test in a 4 m, ϕ320 mm ID column (Test 5). The tests were all controlled at 25° C. The ore was crushed to −40 mm, with 68% −5 mm and 40% −150 μm (on a dry basis); and 81% −5 mm and 58% −150 μm (on a wet basis). The ore assayed 1.07% Cu, 2.15% Fe and 267 ppm Co, with most of the copper present as copper-bearing mica ($KAl_3Si_3O_{10}(OH)_{1.8}F_{0.2}$), but also contained copper-cobalt-wad (CuCoMnFeO), bornite, brochantite, chalcocite, chalcopyrite, chrysocolla, copper-bearing chlorite ($(Mg,Fe,Cu)_5Si_3Al_2O_{10}(OH)_8$), copper-bearing goethite ((Cu,Fe)O(OH)), malachite and pseudo-malachite. Representative batches of the ore sample were agglomerated with either tap water (Rand Water Board) (Test 1), or with tap water (Rand Water Board) and a binder according to the invention (Tests 2, 3, 4 and 5), or acidified irrigation solution and 98% sulphuric acid ($H_2SO_4$) (Test 6), to approximately the same moisture content and then allowed to cure in the respective columns. The columns were all irrigated with tap water (Rand Water Board), which was acidified with 98% $H_2SO_4$. Table 3 lists the different binders according to the invention that were used in the tests, and Table 4 summarises the main test parameters.

TABLE 3

| Binders | |
|---|---|
| Binder | Description |
| Cement A | 64% OPC, modified with 36% fly ash (42.5N) |
| Cement B | 38% OPC, modified with a 50:50 mixture of fly ash and slag (32.5N) |
| Cement C | 50% OPC, modified with a 50:50 mixture of fly ash and slag (42.5N) |

TABLE 4

| Column Leach Test Parameters | | | | | | |
|---|---|---|---|---|---|---|
| ID | Agglomeration | Cement Dosage (kg/t) | Acid-in-Irrigation (g/L) | Curing Time (days) | Irrigation Rate (L/m²/h) | Column Height (m) |
| Test 1 | Water | — | 8 | 28 | 1 | 1 |
| Test 2 | Cement A & Water | 10 | 8 | 28 | 6 | 1 |
| Test 3 | Cement B & Water | 10 | 8 | 28 | 6 | 1 |
| Test 4 | Cement C & Water | 10 | 8 | 28 | 6 | 1 |
| Test 5 | Cement C & Water | 10 | 8 | 28 | 6 | 4 |
| Test 6 | Irrigation Solution & 98% $H_2SO_4$ | — | 8 | 2 | 6 | 4 |

Notes:
Acid: sulphuric acid ($H_2SO_4$)
Water (Rand Water Board)

The columns were initially irrigated at 3 L/m²/h until solution drainage ('break-through') appeared. The irrigation flowrate was then increased to 6 L/m²/h, except in the case of Test 1 which could only be irrigated at 1 L/m²/h due to solution ponding at higher flowrates.

Example 1

Figure 3:
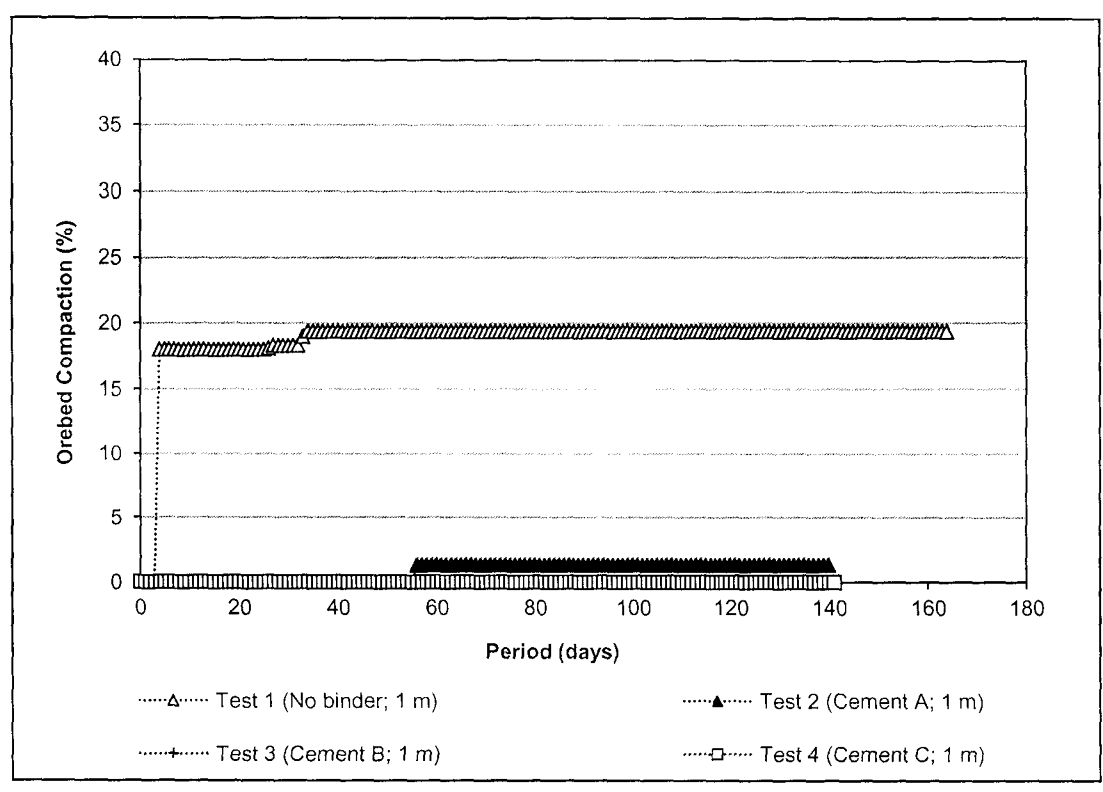
FIG. 3 is a graph which depicts orebed compaction (or slumping) versus time to illustrate the impacts on compaction when no binder and a binder according to the invention are used during column leaching.

FIG. 3 shows the extent of orebed compaction (or slumping) versus time for the test wherein no binder was used (Test 1) against three tests wherein binders according to the invention were used, viz. Test 2 (Cement A), Test 3 (Cement B) and Test 4 (Cement C). Test 1's orebed height decreased (or slumped) by 19% with respect to the original height, with almost all the slumping experienced during the initial stages of irrigation. In comparison Test 2 showed only 1% slumping; and Tests 3 and 4 experienced no slumping at all.

This illustrates that slumping can be alleviated by application of a binder according to the invention.

Example 2

Figure 4:
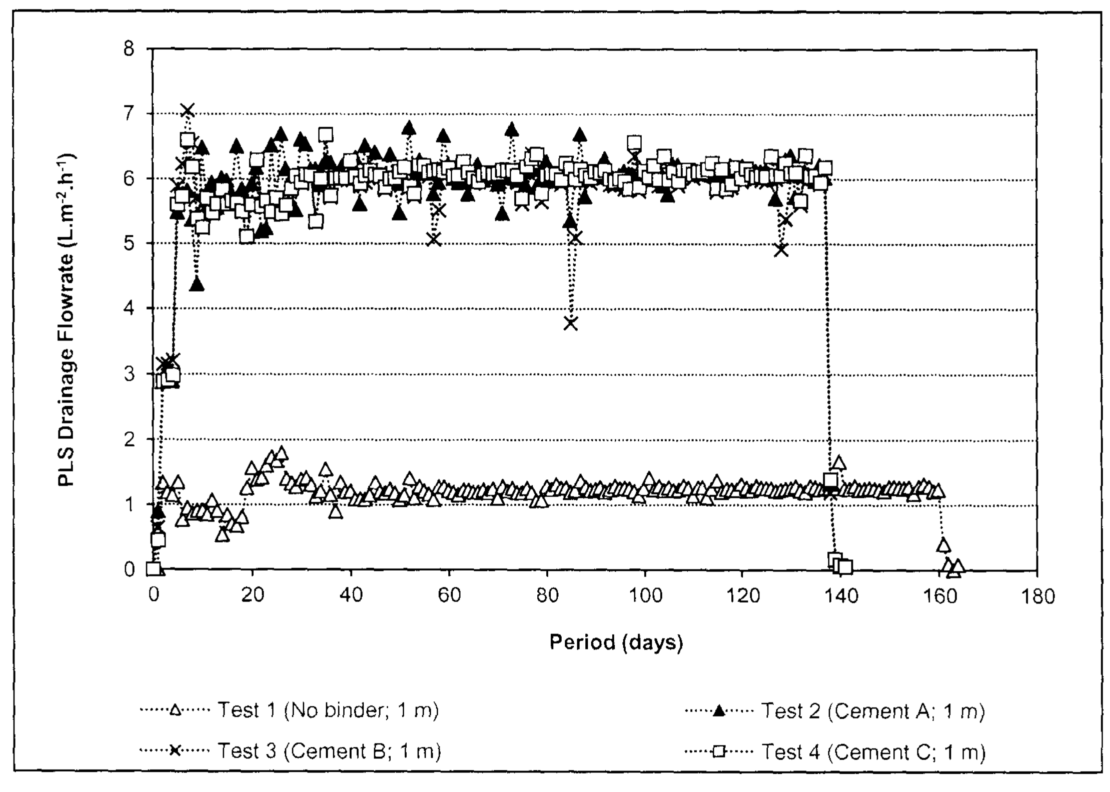
FIG. 4 is a graph which shows the drainages or pregnant leach solution (PLS) flowrates versus time when no binder and a binder according to the invention are used during column leaching.

FIG. 4 shows the drainages or pregnant leach solution (PLS) flowrates versus time for the test wherein no binder was used (Test 1) against three tests wherein binders according to the invention were used, viz. Test 2 (Cement A), Test 3 (Cement B) and Test 4 (Cement C). Test 1's column could only be irrigated as fast as approximately 1 L/m²/h in order to prevent excessive accumulation of solution on the orebed's top surface (or ponding). This was as a result of the orebed's poor solution permeability, presumably caused by the ore's high fines content. The columns of Tests 2, 3 and 4 were continuously irrigated at 6 L/m²/h for the entire duration of the tests (140 days) with no solution ponding observed.

This illustrates that the orebed can be faster irrigated when a binder according to the invention is used. Consequently leaching reagent, which in this case is sulphuric acid ($H_2SO_4$), can also be faster introduced to the orebed.

Example 3

Figure 5:
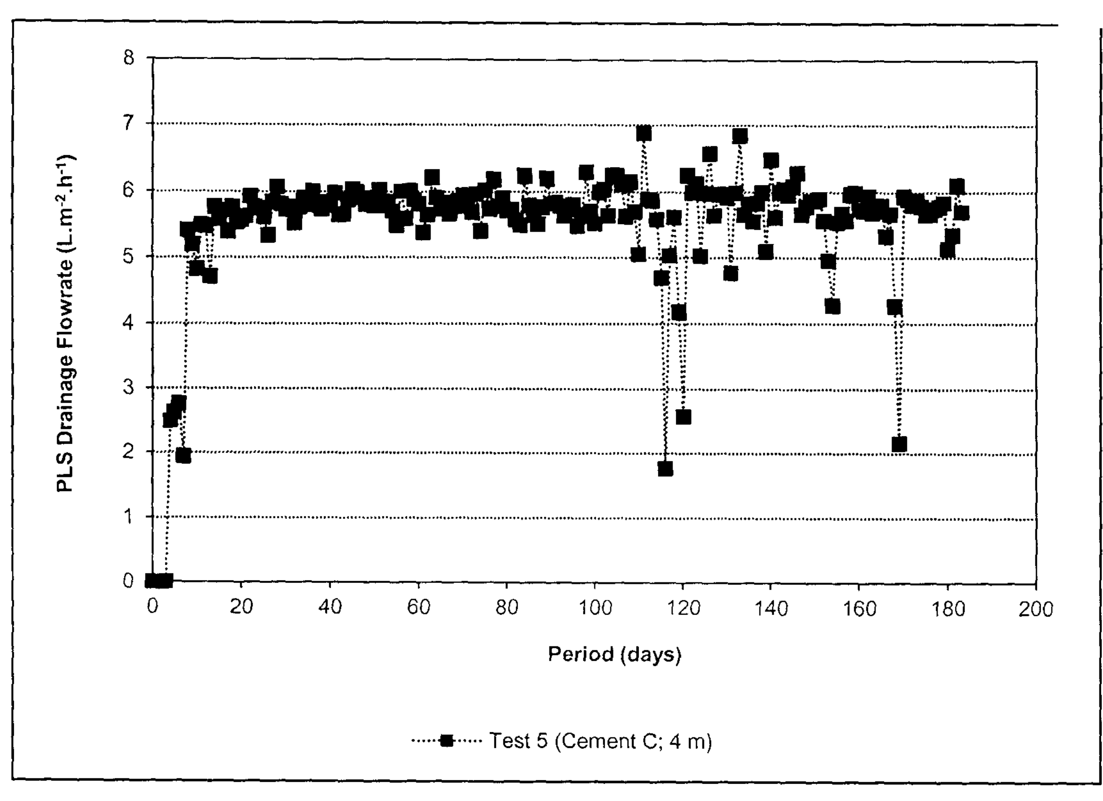
FIG. 5 is a graph which shows the drainage or PLS flowrate versus time when a binder according to the invention is used during leaching at 4 m (in height) column scale.

FIG. 5 shows the drainage or PLS flowrate versus time for Test 5 (Cement C; 4 m) in which a binder according to the invention was used at 4 m column height. As in the case of the 1 m (in height) columns of Tests 2, 3 and 4, this column was also continuously irrigated at 6 L/m²/h for the entire duration of the test (182 days to date) with no solution ponding observed.

This illustrates that a taller stacked orebed (than 1 m) can also be faster irrigated during leaching when a binder according to the invention is used.

Example 4

Figure 6:
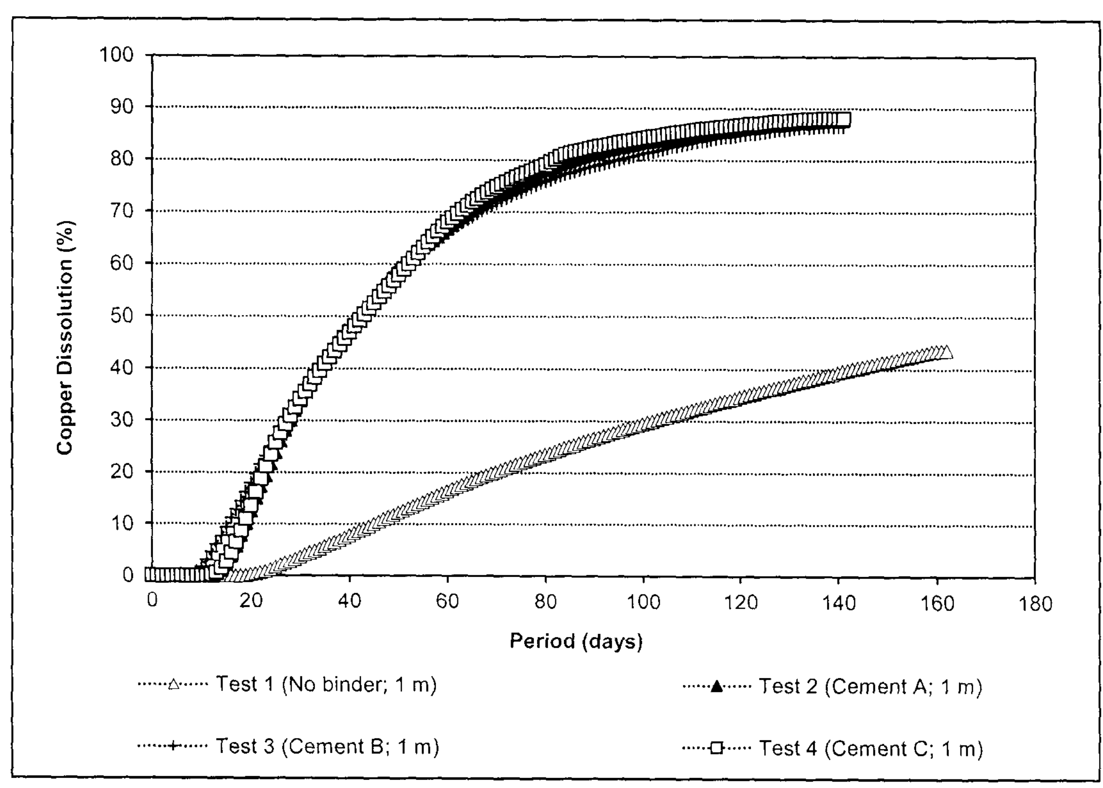
FIG. 6 is a comparative graph which shows copper dissolution versus time when no binder and a binder according to the invention are used during column leaching.

A comparison of the copper dissolution profiles for the test wherein no binder was used (Test 1) versus three tests wherein binders according to the invention were used, viz. Test 2 (Cement A), Test 3 (Cement B) and Test 4 (Cement C), is presented in FIG. 6. Test 1 achieved 44% copper dissolution after 160 days of irrigation. Tests 2, 3 and 4 produced similar copper dissolution profiles showing a faster rate of copper leaching than Test 1, and yielded a higher overall copper dissolution of approximately 88% after 140 days of irrigation.

This illustrates that faster leaching kinetics can be achieved when a binder according to the invention is used. This implies that shorter leach cycles can be used to achieve the same extent of overall copper dissolution.

Example 5

Figure 7:
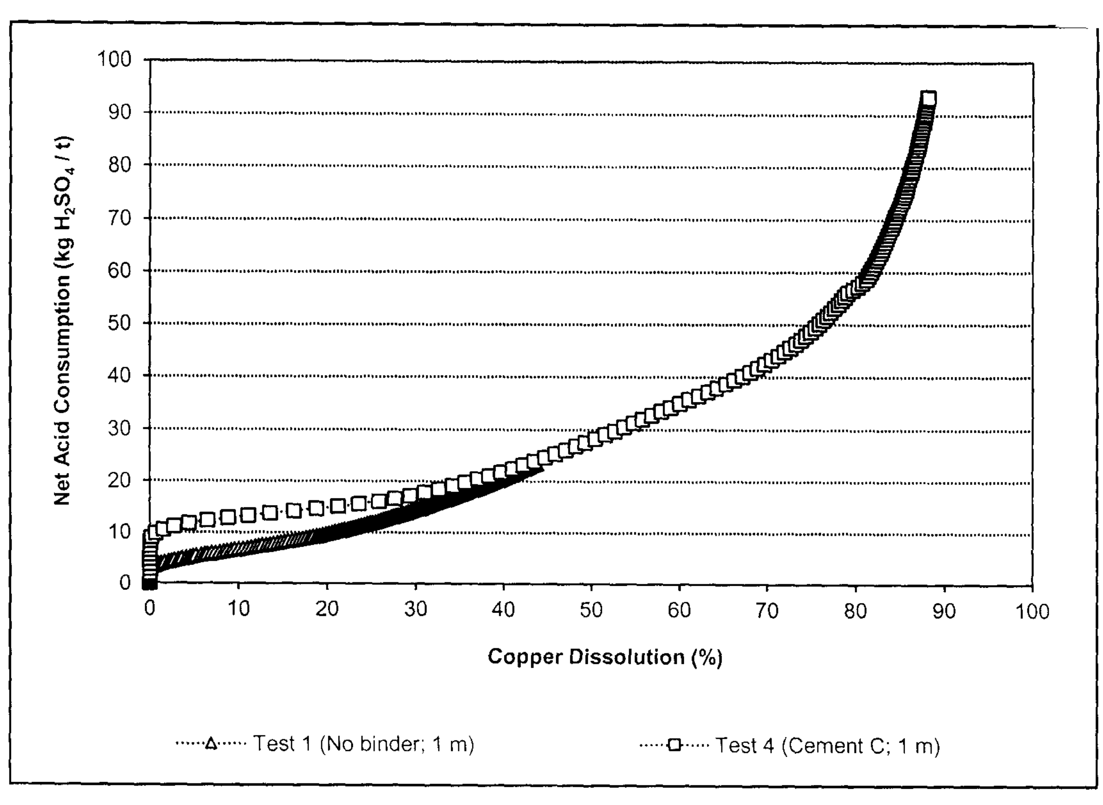
FIG. 7 reflects graphs which show net acid consumption versus copper dissolution when no binder and a binder according to the invention are used during column leaching.

FIG. 7 shows net acid consumption versus copper dissolution profiles for the test wherein no binder was used (Test 1) against a test wherein a binder according to the invention was used, viz. Test 4 (Cement C). Less acid was consumed in Test 1 than Test 4 during the initial stages of leaching, but the difference in consumption decreased with increased copper dissolution. For example, 23.4 kg/t $H_2SO_4$ (Test 1) and 24 kg/t $H_2SO_4$ (Test 4) were consumed respectively to achieve 44% copper dissolution.

This highlights that, if a binder according to the invention is used, the net acid consumption will not be significantly higher than when no binder is used.

Example 6

Figure 8:
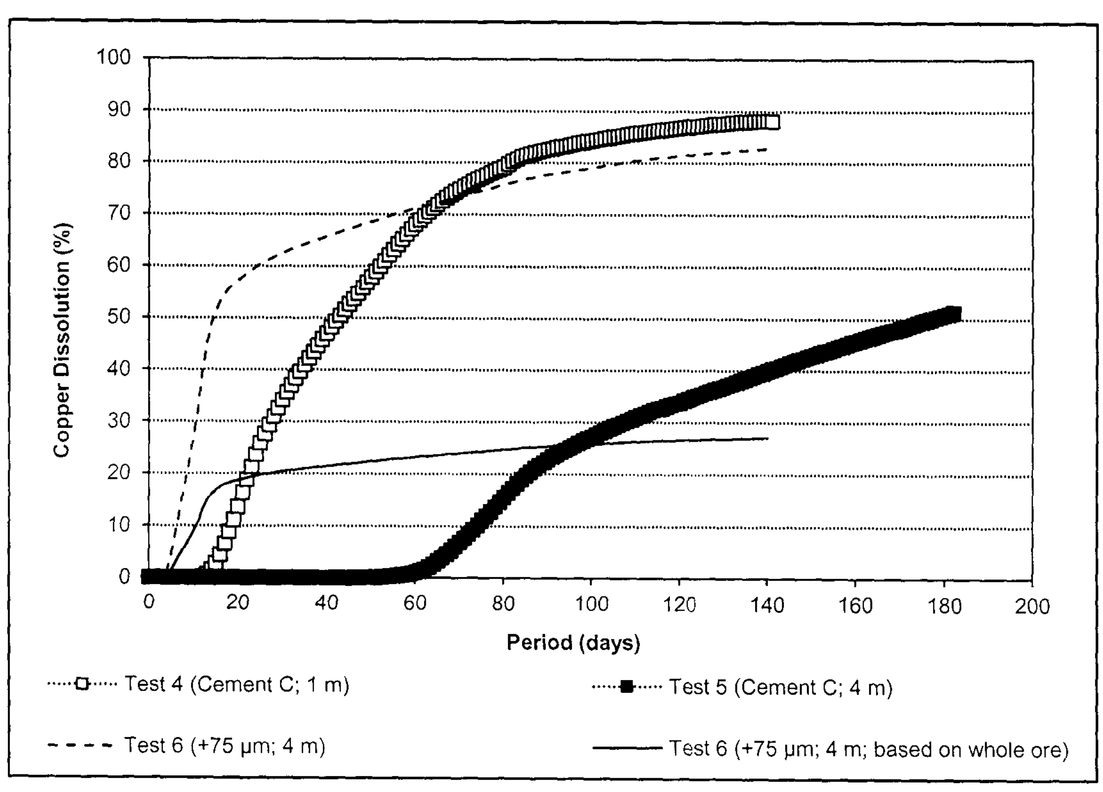
FIG. 8 graphically depicts the impact on copper recovery when a binder according to the invention is used versus scrubbing/desliming.

Two approaches were followed to deal with the ore's high fines content prior to column leaching. This entailed 1) scrubbing the ore and then desliming by wet screening out the −75 μm fraction, and 2) agglomerating the ore with a binder according to the invention. Test 6 (+75 μm; 4 m) constitutes the scrubbing/desliming processing route; and Test 4 (Cement C; 1 m) and Test 5 (Cement C; 4 m) are examples of the invention. Copper dissolution profiles versus time are presented in FIG. 8. Test 6 (+75 μm; 4 m) achieved 83% copper dissolution after 140 days. However, due to the removal of the −75 μm fraction and its associated copper content, the actual copper recovery amounts to only 27% when based on the original ore mass prior to scrubbing and desliming; this is highlighted in the copper dissolution profile of Test 6 (+75 μm; 4 m; based on whole ore). The result of Test 4 (Cement C; 1 m) shows that a copper recovery of up to 88% is feasible by application of the invention. In addition, 51% copper dissolution has been achieved after 182 days at 4 m column scale in Test 5 (Cement C; 4 m).

This illustrates that it is possible to recover 61% more copper in a single leaching stage by application of the invention compared with the scrubbing/desliming processing route.

The invention claimed is:

1. A binder for use in leaching a heap of a low-permeability ore containing at least one of the following: copper ore, copper/cobalt ore, nickel laterite ore and uranium ore, wherein the binder is ordinary Portland cement (OPC) which is modified with a supplementary cementitious material (SCM) to improve acid resistance.

2. A binder according to claim 1 wherein the OPC is modified by the addition of one or a combination of the following SCMs which have pozzolanic properties:

coal power station fly ash (class F), 10-80 mass % preferably 15-25 mass %;

coal power station fly ash (class C), 10-80 mass % preferably 15-40 mass %;

ground iron blast furnace slag, 10-80 mass % preferably 35-50 mass %;

silica fume, 10-80 mass % preferably 5-10 mass %;

natural pozzolans such as volcanic ash or volcanic rock; and sodium silicate (water glass).

3. A binder according to claim 1 wherein calcium in the OPC is consumed to produce additional calcium silicate hydrate (C—S—H in cement chemist notation) and calcium aluminate hydrate (C-A-H) reaction products to replace calcium hydroxide (C—H) bonds, thereby increasing the strength and acid resistance of agglomerates used with the binder.

4. A binder according to claim 1 wherein the binder comprises 64% OPC (42.5 N) modified with 36% fly ash.

5. A binder according to claim 1 wherein the binder comprises 38% OPC (32.5 N) modified with a mixture of fly ash and slag.

6. A binder according to claim 1 wherein the binder comprises 50% OPC (42.5 N) modified with a mixture of fly ash and slag.

7. A method of heap leaching a low-permeability ore comprising one or more of the following: copper ore, copper/cobalt ore, nickel laterite ore and uranium ore using a binder wherein the method includes the steps of:

adding the binder according to claim 1 thereby to form an agglomerated ore;

stacking the agglomerated ore to form a heap; and irrigating the heap with a leach solution.

8. A method according to claim 7 wherein the leach solution is dilute sulphuric acid.

9. A method according to claim 7, wherein adding the binder includes adding a binder in which the OPC is modified by the addition of one or a combination of the following SCMs which have pozzolanic properties:

coal power station fly ash (class F), 10-80 mass % preferably 15-25 mass %;

coal power station fly ash (class C), 10-80 mass % preferably 15-40 mass %;

ground iron blast furnace slag, 10-80 mass % preferably 35-50 mass %;

silica fume, 10-80 mass % preferably 5-10 mass %;

natural pozzolans such as volcanic ash or volcanic rock; and sodium silicate (water glass).

10. A method according to claim 7 wherein calcium in the OPC is consumed to produce additional calcium silicate hydrate (C—S—H in cement chemist notation) and calcium aluminate hydrate (C-A-H) reaction products to replace calcium hydroxide (C—H) bonds, thereby increasing the strength and acid resistance of agglomerates used with the binder.

11. A method according to claim 7 wherein the binder comprises 64% OPC (42.5 N) modified with 36% fly ash.

12. A method according to claim 7 wherein the binder comprises 38% OPC (32.5 N) modified with a mixture of fly ash and slag.

13. A method according to claim 7 wherein the binder comprises 50% OPC (42.5 N) modified with a mixture of fly ash and slag.

* * * * *